(12) United States Patent
Kanner et al.

(10) Patent No.: US 8,576,114 B2
(45) Date of Patent: Nov. 5, 2013

(54) LOCATION OF A TRANSPONDER CENTER POINT

(75) Inventors: Abe Kanner, Mississauga (CA); Pat Seitz, Milton (CA)

(73) Assignee: Thales Canada Inc., Toronto, Ontario (CA)

( * ) Notice: Subject to any disclaimer, the term of this patent is extended or adjusted under 35 U.S.C. 154(b) by 200 days.

(21) Appl. No.: 13/168,519

(22) Filed: Jun. 24, 2011

(65) Prior Publication Data

US 2012/0326916 A1 Dec. 27, 2012

(51) Int. Cl.
*G01S 13/76* (2006.01)

(52) U.S. Cl.
USPC .............. 342/42; 342/44; 342/46; 342/51

(58) Field of Classification Search
USPC ................................ 342/42–51
See application file for complete search history.

(56) References Cited

U.S. PATENT DOCUMENTS

| | | | | |
|---|---|---|---|---|
| 3,243,811 A * | 3/1966 | Hose | | 342/89 |
| 4,418,349 A * | 11/1983 | Hofgen et al. | | 342/37 |
| 4,471,344 A * | 9/1984 | Williams | | 340/572.2 |
| 4,768,740 A * | 9/1988 | Corrie | | 246/25 |
| 4,806,932 A * | 2/1989 | Bechtel | | 342/33 |
| 5,144,313 A * | 9/1992 | Kirknes | | 342/44 |
| 5,258,766 A * | 11/1993 | Murdoch | | 343/742 |
| 5,532,697 A * | 7/1996 | Hidaka et al. | | 342/104 |
| 5,541,399 A * | 7/1996 | de Vall | | 235/491 |
| 5,594,448 A * | 1/1997 | d'Hont | | 342/44 |
| 7,667,572 B2 * | 2/2010 | Husak et al. | | 340/10.1 |
| 8,258,956 B1 * | 9/2012 | Kuzma et al. | | 340/572.1 |
| 2003/0127570 A1 * | 7/2003 | Ireland | | 246/122 A |
| 2006/0022800 A1 * | 2/2006 | Krishna et al. | | 340/10.2 |
| 2006/0175407 A1 * | 8/2006 | Kinoshita | | 235/451 |
| 2007/0023520 A1 * | 2/2007 | Miyashita | | 235/451 |
| 2007/0032250 A1 * | 2/2007 | Feher | | 455/456.2 |

(Continued)

FOREIGN PATENT DOCUMENTS

| | | |
|---|---|---|
| CN | 101020463 A | 8/2007 |
| DE | 102006029538 A1 | 12/2007 |

(Continued)

OTHER PUBLICATIONS

Kiriczi, S.; Schnieder, E., "Possibilities of failure detection and identification (FDI) in a train localization system," Railroad Conference, 1994., Proceedings of the 1994 ASME/IEEE Joint (in Conjunction with Area 1994 Annual Technical Conference) , vol., No., pp. 141,145, Mar. 22-24, 1994.*

(Continued)

*Primary Examiner* — John B Sotomayor
(74) *Attorney, Agent, or Firm* — Marks & Clerk; Richard J. Mitchell

(57) ABSTRACT

In a radio location system for vehicles moving along a guideway, a transmitter for energizes a transponder beside the guideway. A first detector for detects a response signal from the energized transponder to determine the transponder identification. A second detector detects a positional signal received from the transponder that is decoupled from the first signal and contains precise positional information. In one embodiment, the second detector picks up a crossover signal from a crossover antenna.

9 Claims, 2 Drawing Sheets

(56) References Cited

U.S. PATENT DOCUMENTS

| | | |
|---|---|---|
| 2007/0146159 A1 | 6/2007 | Kato et al. |
| 2010/0007469 A1 | 1/2010 | Cardullo |
| 2010/0026562 A1 | 2/2010 | Hyodo et al. |
| 2010/0107925 A1 | 5/2010 | Bounds |
| 2010/0328073 A1* | 12/2010 | Nikitin et al. ............ 340/572.1 |
| 2011/0130899 A1 | 6/2011 | Beaurent et al. |
| 2011/0187600 A1* | 8/2011 | Landt ......................... 342/458 |
| 2012/0037761 A1 | 2/2012 | Bock et al. |
| 2012/0169478 A1* | 7/2012 | Spindel et al. ............. 340/10.6 |
| 2012/0326916 A1* | 12/2012 | Kanner et al. ................ 342/44 |
| 2012/0326924 A1* | 12/2012 | Kanner ................... 342/357.31 |

FOREIGN PATENT DOCUMENTS

| | | |
|---|---|---|
| EP | 2090491 A1 | 8/2009 |
| JP | 01185106 A | 3/1999 |
| JP | 2008-024146 A | 2/2008 |
| WO | 2011125074 A1 | 10/2011 |

OTHER PUBLICATIONS

Burnman et al., "Radio Frequency Detection Device", TDB v37, Jun. 1, 1994.

\* cited by examiner

LOCATION OF A TRANSPONDER CENTER POINT

FIELD OF THE INVENTION

This invention relates to the field of vehicle location systems, and more particularly to the precise location of a moving vehicle fitted with a transponder.

BACKGROUND OF THE INVENTION

Transponders, and more particularly RFID (Radio Frequency Identification) transponders, are used to obtain absolute position of vehicles, such as trains, moving along a guideway. However a transponder extends over a finite distance known as a footprint, and locating the center of a transponder (RFID) to provide precise accurate positioning information is difficult due to the nature of radio transmission propagation, specifically in tunnels.

Currently the best solutions estimate the location of the transponder center point by external means or use expensive transponders. These control the transponder footprint to ensure correct identification of the location. However, it is hard from the point of radio transmission to ensure that the footprint will not exceed its specified values.

Estimation is not good enough as it does not ensure that the train will stop accurately in a station, and specifically stations with platform doors. Expensive transponders, although they ensure that the footprint is optimized, cannot ensure the location of the transponder in a safe vital manner due to the nature of radio transmission.

SUMMARY OF THE INVENTION

Embodiments of the invention identify with high accuracy the center point of a transponder to be used for absolute positioning. In addition due to the vital nature of the positioning in a CBTC (Communication-Based Train Control) system, the detection of the center of the transponder has safety implications, which this solution may ensure.

The basic idea of the invention is to decouple the radio transmission for the tag ID and thus the footprint from the identification of the center point of the transponder. This is achieved by providing an independent secondary means to allow precise detection of the center of the transponder, where the "center" in this context refers to a known reference point on the transponder and does not necessarily imply the geometric center.

According to the present invention there is provided a radio location system for vehicles moving along a guideway, comprising a transmitter for energizing a transponder beside the guideway; a first detector for detecting a response signal from the energized transponder to determine the transponder identification; and a second detector for detecting a positional signal received from the transponder that is decoupled from the first signal and provides precise positional information.

Embodiments of the invention enable the position of the moving vehicle, for example the train, to be estimated to within one or two centimeters. In one embodiment, the crossover point of a crossover antenna provides the center point. A noted the "center point" does not actually have to be in the center of the transponder; it is merely a known reference point, which allows the fine position provided by the secondary system to be obtained. The primary system, which gives the ID of the transponder, establishes the coarse position of the train, but this suffers from an imprecision due to the finite footprint of the transponder. The fine position provided by the secondary system determines the precise position of the train within the transponder footprint.

In one embodiment the invention includes crossover antenna on both the transponder and moving vehicle. When the transponder receives the energizing signal from the train, it sends a signal, which can be just a carrier, through the crossover antenna. This signal is picked up by a crossover antenna on the train, and a demodulator determines when the center points of the crossover antennas coincide by detecting the change in phase as the center points cross.

The positional signal transmitter is powered by the energy received from the moving vehicle in the same way as the coded signal transmitter. In one embodiment, the train carries two crossover antennas, on each side of the main transponder antenna, so that a crossover antenna will be downstream of the transponder antenna, whichever direction the train is moving in.

In another aspect the invention provides a method of determining the position of a moving vehicle on a guideway with precision, comprising transmitting an energizing signal to a trackside transponder from the moving vehicle; transmitting a coded identification signal from the trackside transponder upon receipt of the energizing signal; transmitting a second signal from an additional antenna associated with the trackside transponder upon receipt of the energizing signal, said second signal being decoupled from said coded identification signal; and determining the precise position of the moving vehicle from the second signal.

BRIEF DESCRIPTION OF THE DRAWINGS

The invention will now be described in more detail, by way of example only, with reference to the accompanying drawings, in which: —

DETAILED DESCRIPTION OF THE INVENTION

Figure 1:
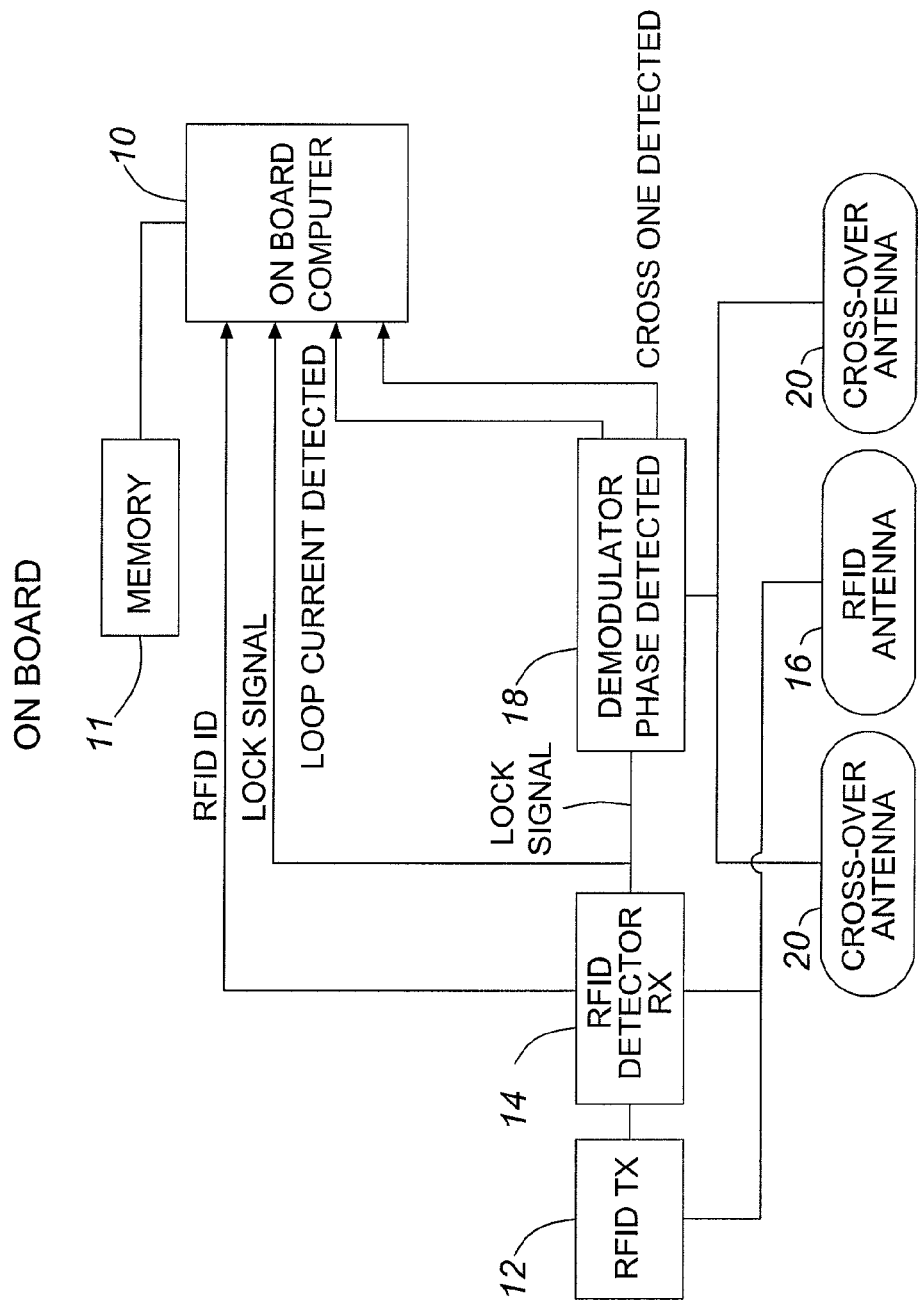
FIG. 1 is a block diagram of an on-board detection system.

An RFID system typically consists of three components: a transponder or tag (or multiple tags), a reader or interrogator and the necessary supporting infrastructure (both hardware and software).

An RFID reader, or interrogator, is a device to communicate with the RFID tag. It broadcasts a radio signal, which is received by the tag. The tag then transmits its information back to the reader using the energy supplied by the transmitter. Readers can either be portable handheld terminals or fixed devices on moving vehicles such as trains for location/positioning determination.

RFID tags, also known as transponders, are usually small pieces of material, typically comprising three components: an antenna, a microchip unit containing memory storage and an encapsulating material. Tags can be either read-only or read-write tags. These terms refer to whether or not the information stored on the tag can be changed or erased. A Read-only Tag is a form of RFID tag that has an identification code (more specifically, an Electronic Product Code) which provide the absolute location of the transponder in the guideway.

In accordance with embodiments of the invention, the energy provided by the RFID reader/transmitter is used to energize a secondary circuit fitted into the transponder, which then energizes a loop with a single transposition crossover housed within the transponder. Antennas on board the train detect the current in the loop and the phase shift of the induced current in the loop as antennas pass over the loop to detect the center point of the transponder.

The on-board RFID reader/transmitter transmits energy that is used to energize the reflected signal in the transponder to provide the transponder ID. When the transponder reflects the energy back, the signal is demodulated to provide the coding of the ID.

When the RFID receiver on board the train detects the reflected signal a lock signal is set high. This lock signal indicates to the on-board computer that a transponder is within detection range. However due to reflection and multipathing of the signal, it cannot be assured that the received signal is only detected when the RFID reader/transmit antenna is actually over the transponder.

When the lock signal is detected, the detection circuit for evaluating the phase changes of the crossover is energized. The signal received by the crossover detection antennas is evaluated, and when the phase shifts indicating the crossover point, a signal is provided to the on-board computer to indicate the precise location of the crossover, which is co-incident with the center of the transponder.

By using the diverse detection means of the transponder ID and the detection of the crossover, a decoupling between the transponder ID and the location of the center of the transponder is achieved. This decoupling reduces the sensitivity of the detection to variation of the transponder footprint, as the detection of the crossover point is independent of the footprint. Changes of the footprint do not affect the crossover detection.

The transponder may be modified with the addition of circuits to provide for conditioning of the beam power to allow the powering of the crossover circuit by the beam. Circuits for frequency division of the original signal or an oscillator and circuitry to power the crossover can be added to the transponder.

Whenever the transponder is illuminated by an interrogator beam from the train, the crossover circuit is energized. The on-board transponder interrogator is enhanced by the addition of the crossover receive antennas and the crossover detection circuit. When the circuit receives the signal, it evaluates the induced signal and records the phase of the signal.

As the energy provided into the crossover is low, the crossover receive antennas need to be in close proximity with the transponder in order to magnetically couple with the generated signal in the near field. Once the train passes over the transponder center, the crossover is detected and the information passes to the on-board computer. The on-board computer correlates the transponder ID and the point of the crossover and the location in the database to precisely position the train on the guideway.

The inductive coupling between the crossovers' receive antennas and the detection of the crossover provide precise and vital identification of the transponder center point independent of the size of the transponder footprint.

Turning now to FIG. 1, which shows a detailed embodiment of the invention, the radio location system comprises an on-board computer 10 controlling operation of the system, which includes an RFID transmitter 12 and an RFID detector/receiver 14. The RFID transmitter and detector/receiver are connected to RFID antenna 16.

Upon receipt of a coded RFID signal picked up by antenna 16, the RFID detector/receiver 14 sends the decoded RFID ID to the on-board computer 10, which determines the coarse position of the trackside transponder by looking up the ID in a look-up table in memory 11.

Upon receipt of the coded RFID signal, the RFID detector/receiver 14 also generates a lock signal, which is sent to the on-board computer 10 and phase demodulator 18 to activate them.

The phase demodulator 18 is connected to each crossover antenna 20 on either side of the RFID antenna 16 so that whatever the direction of movement of the train, a crossover antenna 20 will be located downstream of the RFID antenna 16.

Figure 2:
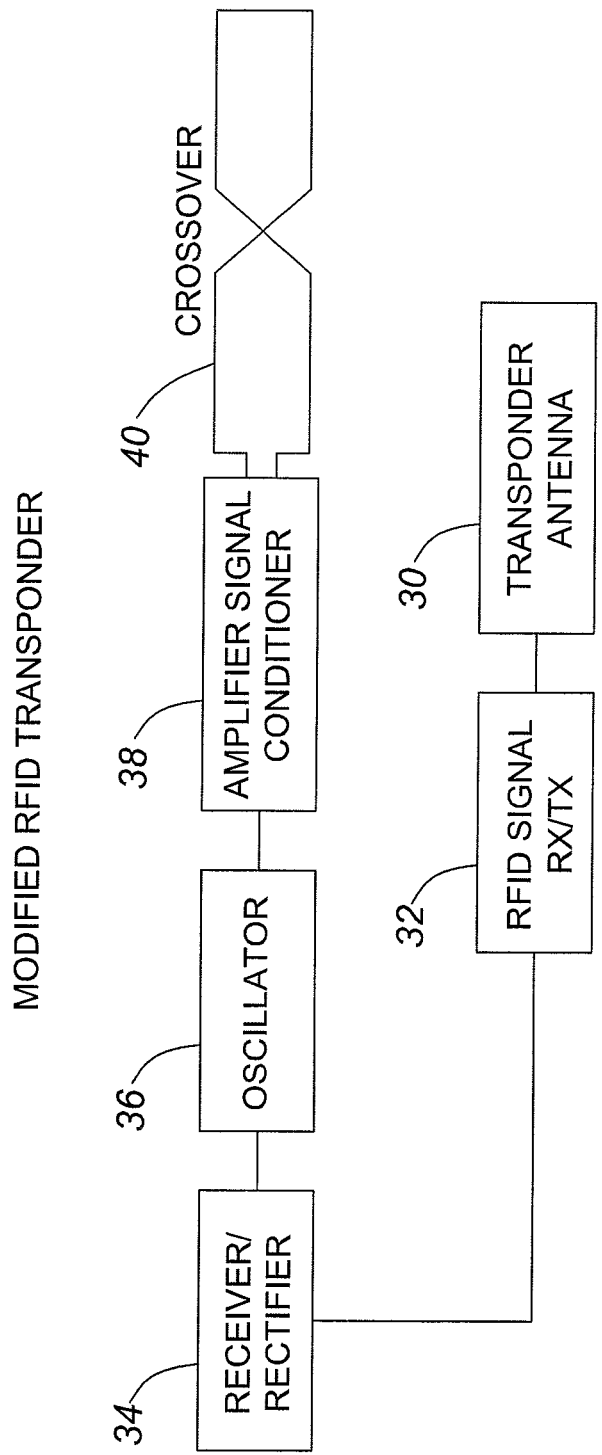
FIG. 2 is a block diagram of a trackside transponder system.

The trackside transponder is shown in FIG. 2. This comprises a transponder antenna 30, an RFID signal receiver/transmitter unit 32, and a receiver/rectifier 34. In response to the receipt of an energizing signal by the transponder 30, the RFID signal receiving/transmitter unit 32 sends a coded signal to the RFID antenna 16 on the train via the transponder antenna 30. The RFID device is powered by the voltage generated from the energizing signal received from the moving vehicle.

The receiver/rectifier 34 also powers oscillator 36, which generates a signal that is passed through amplifier signal conditioner 38 to crossover antenna 40 placed at a known location relative to the transponder and whose crossover point corresponds to the "center" or reference point of the transponder, or at least is located a known distance from it.

A crossover antenna, as is known in the art, contains two loops with the current flowing in opposite directions. The result is that the radiation from the two loops cancels out in the far field, but not in the near field.

As the moving vehicle, which may be a train in a tunnel, passes the crossover antenna, the receiving crossover antenna picks up the phase change as the center point of the receiving antenna passes the center point of the transmitting antenna. The point at which this phase change is detected indicates the moment when the train is passing the center point of the transmitting antenna 40. As a result on-board computer 10 can determine the position of the train with a high degree of precision.

It should be noted that in the above embodiment, the positional signal is decoupled from the RFID signal. Moreover, the positional signal can be a pure sine wave. It does not have to be coded in any way because the on-board computer determines the coarse location of the tag from its ID. As the location of the center of the crossover antenna is precisely known, the fine position of the train can be determined by the on-board computer.

An advantage of the above embodiment is that it allows an accurate determination of the transponder center point to an accuracy of 1-2 cm independently of the radio transmission and thus independent of the transponder footprint.

It will be appreciated that the term "circuit" is used herein in the most general sense and includes an implementation software. It should also be appreciated by those skilled in the art that any block diagrams herein represent conceptual views of illustrative circuitry embodying the principles of the invention. For example, a processor may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non volatile storage. Other hardware, conventional and/or custom, may also be included. The term circuit is used herein to encompass functional blocks that may in practice be implemented in software.

We claim:

1. A radiolocation system for a vehicles moving along a guideway, comprising:
    an on-board transmitter for successively energizing radio frequency identification (RFID) transponders distributed along the guideway as the vehicle moves past each transponder, each transponder being associated with a transponder ID;
    an on-board radiofrequency identification (RFID) antenna;
    an on-board RFID detector/receiver configured to detect a coded RFID signal received by said RFID antenna containing the transponder ID from an energized transponder and to generate a lock signal upon detection of the coded RFID signal;
    at least one on-board crossover loop antenna configured to couple inductively with a guideway side crossover loop antenna co-located with each transponder as the vehicle moves past each transponder;
    an on-board phase demodulator for detecting a phase change in a signal from the at least one on-board crossover loop antenna when the at least one on-board crossover loop antenna is coupled with the guideway side crossover loop antenna; and
    an on-board computer configured, upon receipt of said lock signal, to determine the coarse position of the vehicle based on the transponder ID and to determine a precise position of the vehicle from a crossover point at which said phase change is detected.

2. A radiolocation system as claimed in claim 1, wherein a said on-board crossover loop antenna is located on each side of said on-board RFID antenna.

3. A radiolocation system as claimed in claim 1, further comprising an on-board look-up table containing the course positions of the trackside transponders based on transponder ID, and wherein said on-board computer is configured to determine the coarse position of the vehicle by looking up the transponder ID in said look-up table.

4. A transponder for use with a radiolocation system for a vehicles moving along a guideway, comprising:
    a radiofrequency identification (RFID) transponder antenna;
    a crossover loop antenna for inductively coupling with a crossover loop antenna on a passing moving vehicle;
    an RFID receiver/transmitter responsive to reception of an energizing signal from a moving vehicle to transmit a coded RFID signal containing a transponder ID through said RFID antenna;
    a receiver/rectifier for generating power from the energizing signal; and
    an oscillator powered by the receiver/rectifier for generating a signal for the crossover loop antenna upon receipt of said energizing signal.

5. A method as claimed in claim 4 wherein a lock signal is generated in response to the receipt of the coded identification signal, and an on-board computer on the moving vehicle determines the crossover point upon receipt of the lock signal.

6. A method as claimed in claim 5, wherein the moving vehicle receives the second signal at two crossover loop antennas, one on each side of an antenna receiving the coded radio frequency identification signal.

7. A transponder as claimed in claim 4 further comprising a signal conditioner for conditioning the signal for the crossover loop antenna.

8. A method of determining the position of a moving vehicle on a guideway with precision, comprising:
    transmitting a radio frequency identification (RFID) energizing signal to a trackside RFID transponder from the moving vehicle;
    receiving a coded identification first signal containing a transponder ID from the guideway side transponder;
    receiving at a crossover loop antenna a second signal from guideway side crossover loop antenna co-located with the guideway side transponder;
    determining a coarse position of the vehicle from the transponder ID;
    detecting a phase change in the second signal; and
    determining the precise position of the moving vehicle from a crossover point at which the phase change is detected.

9. A method as claimed in claim 8, wherein the coarse position of the vehicle is determined by looking up the transponder ID in an on-board look-up table.

* * * * *

UNITED STATES PATENT AND TRADEMARK OFFICE
CERTIFICATE OF CORRECTION

| | |
|---|---|
| PATENT NO. | : 8,576,114 B2 |
| APPLICATION NO. | : 13/168519 |
| DATED | : November 5, 2013 |
| INVENTOR(S) | : Abe Kanner et al. |

It is certified that error appears in the above-identified patent and that said Letters Patent is hereby corrected as shown below:

Column 6 line 14, "as claimed in claim 4" should read "as claimed in Claim 7;".

Signed and Sealed this
Fifth Day of April, 2016

Michelle K. Lee
*Director of the United States Patent and Trademark Office*